United States Patent [19]

O'Callaghan et al.

[11] Patent Number: 4,863,596
[45] Date of Patent: Sep. 5, 1989

[54] CELL ALIGNMENT FRAME ASSEMBLY

[75] Inventors: Gary L. O'Callaghan, Dickinson; Levi Haddock, Jr.; John D. Cox, both of Texas City, all of Tex.

[73] Assignee: Amoco Corporation, Chicago, Ill.

[21] Appl. No.: 162,055

[22] Filed: Feb. 29, 1988

[51] Int. Cl.[4] .......................... C02F 1/46; C25B 1/16; C25B 1/26; C25B 9/00

[52] U.S. Cl. .................... 210/230; 210/237; 210/241; 210/250; 210/321.75; 204/253; 204/285; 204/297 R

[58] Field of Search ............... 210/230, 232, 237, 249, 210/250, 241, 321.75; 55/356, 358, 483; 204/271, 285, 297 R, 253, 254, 255, 256, 257, 258, 279

[56] References Cited

U.S. PATENT DOCUMENTS

| | | | |
|---|---|---|---|
| 2,282,058 | 5/1942 | Hunter et al. | 204/256 |
| 3,219,573 | 11/1965 | Chen et al. | 210/321.75 |
| 4,059,495 | 11/1977 | de Nora et al. | 204/256 |
| 4,129,495 | 12/1978 | Fitch et al. | 204/279 |
| 4,430,179 | 2/1984 | Ford et al. | 204/279 |
| 4,439,297 | 3/1984 | Kircher et al. | 204/257 |
| 4,541,911 | 9/1985 | Burgess et al. | 204/253 |

OTHER PUBLICATIONS

Galluzzo, "Portable Filter Lends Flexibility to Operation", *Chemical Engineering*, Mar. 24, 1969, p. 182.

*Primary Examiner*—W. Gary Jones
*Attorney, Agent, or Firm*—Thomas W. Tolpin; William H. Magidson; Ralph C. Medhurst

[57] ABSTRACT

A special, easy to use, economical frame is provided to quickly and efficiently align water purification cells in a vertical stack. The dependable, effective frame has moveable side and back posts and convenient crank or slide rod adjustments.

8 Claims, 4 Drawing Sheets

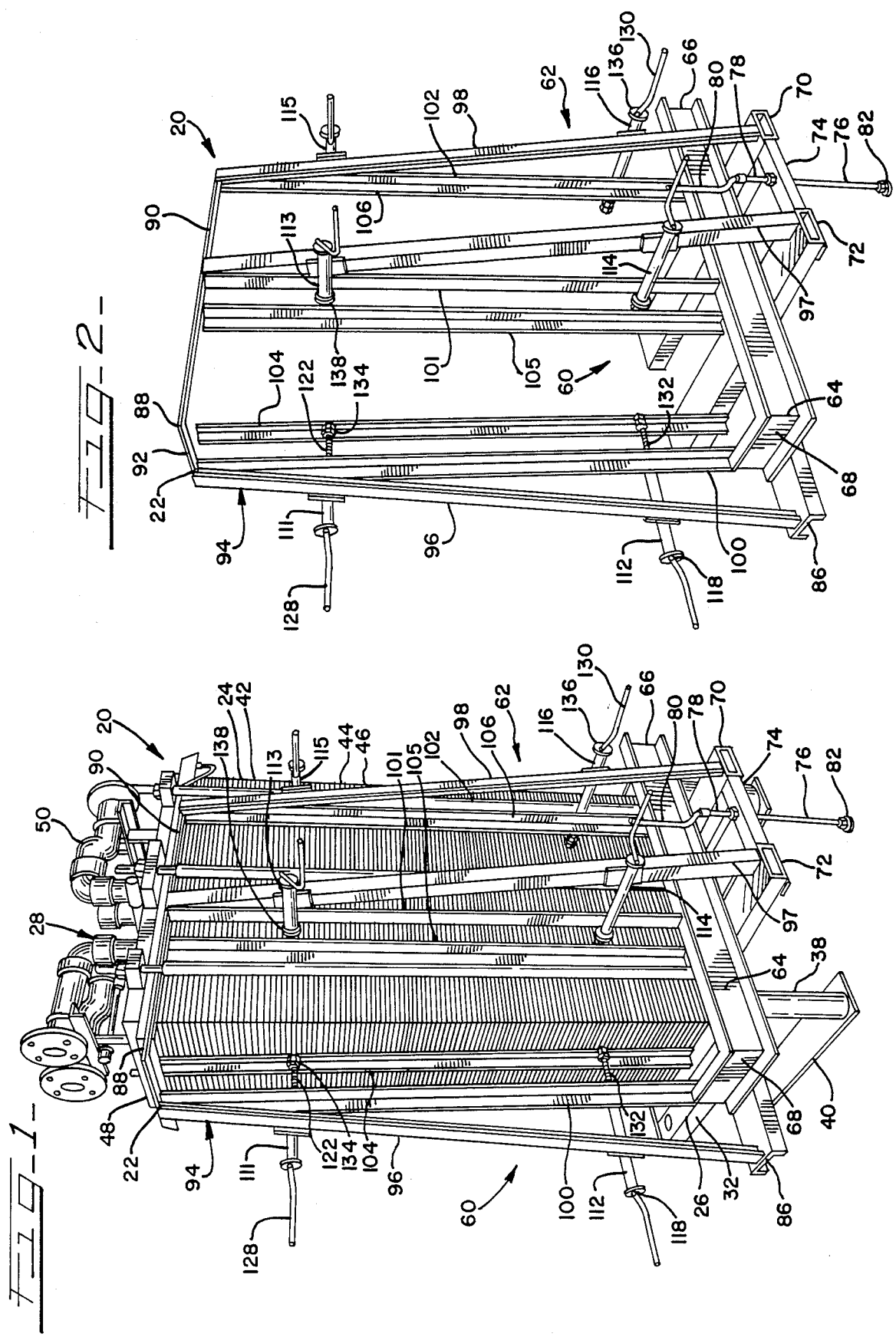

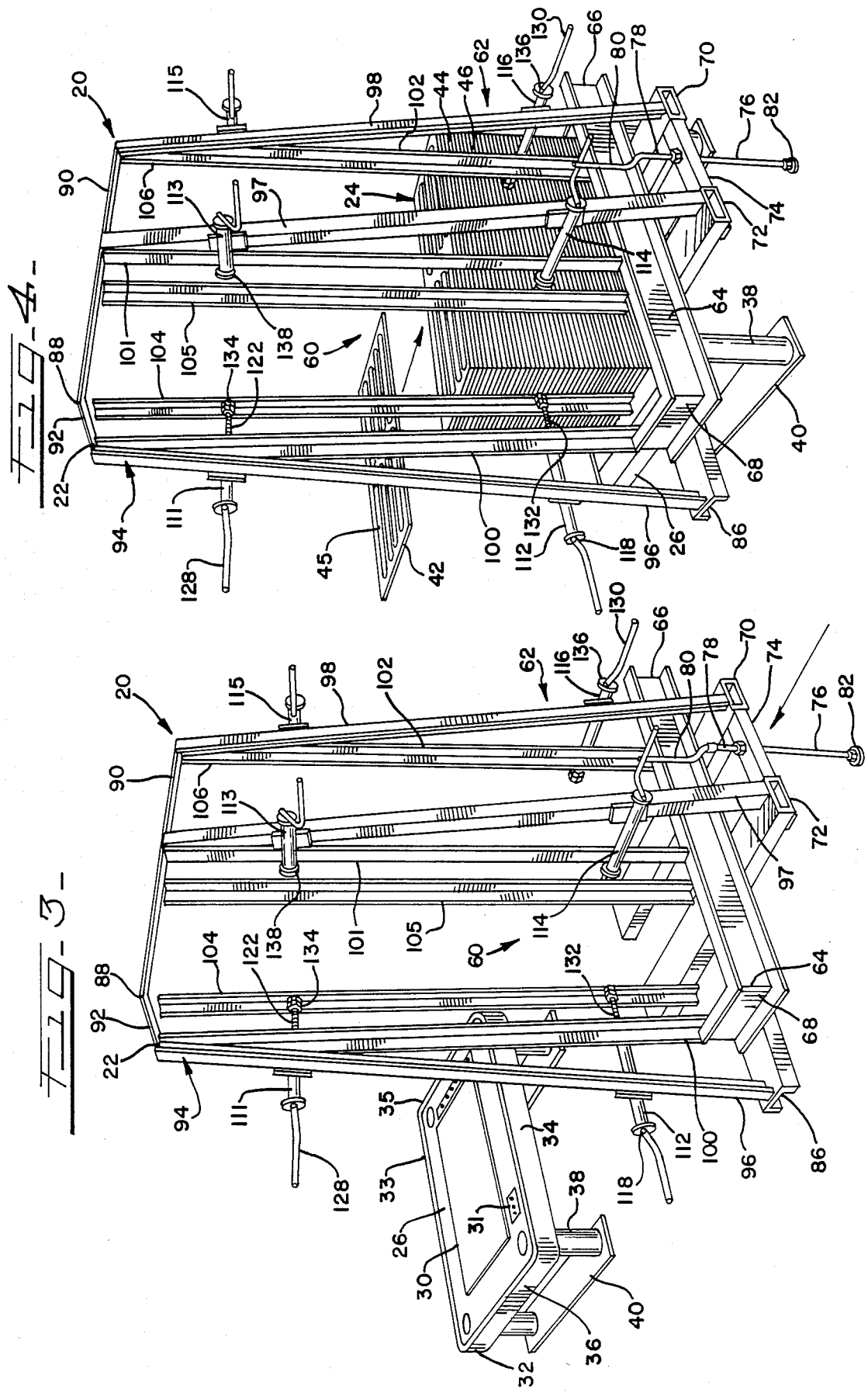

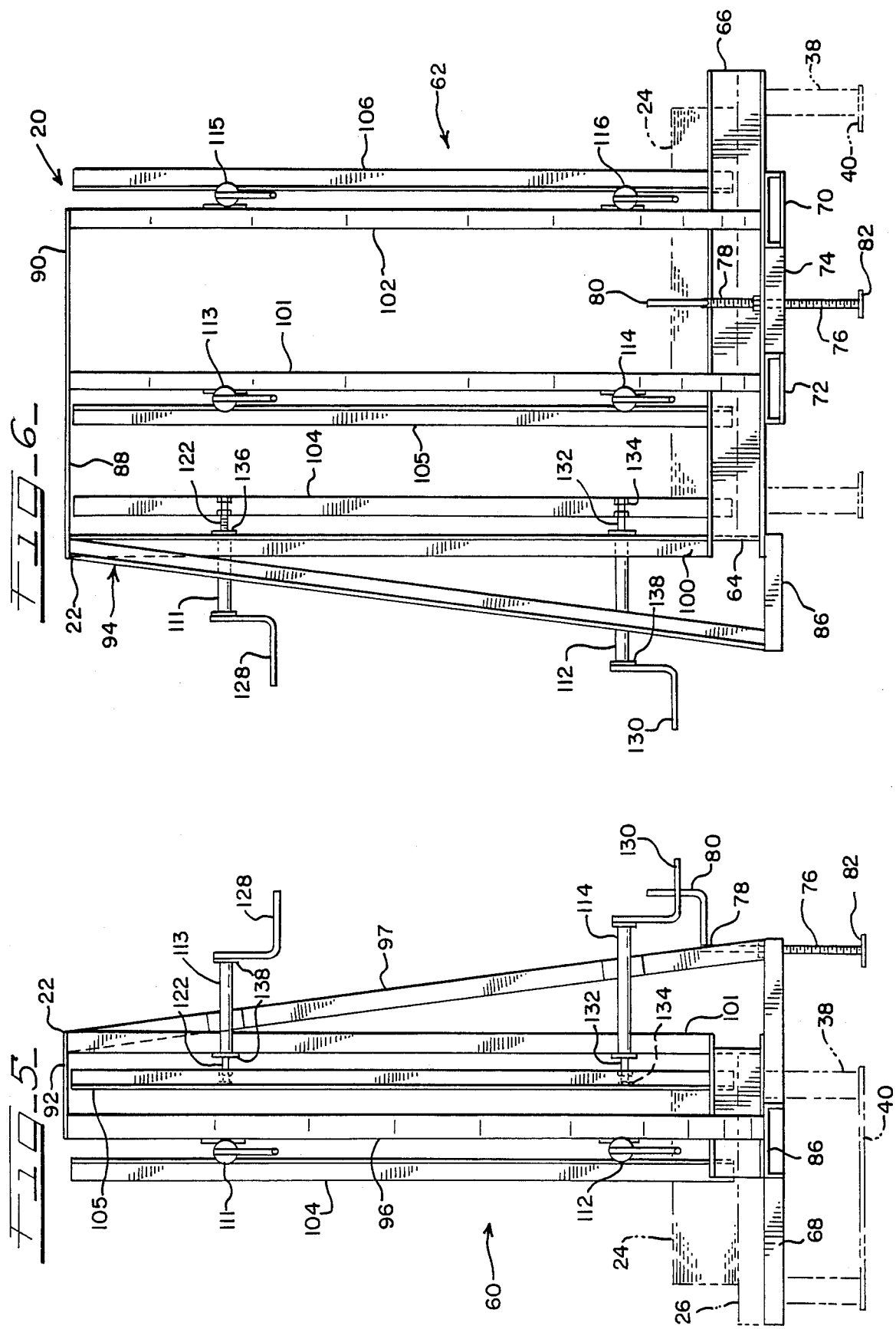

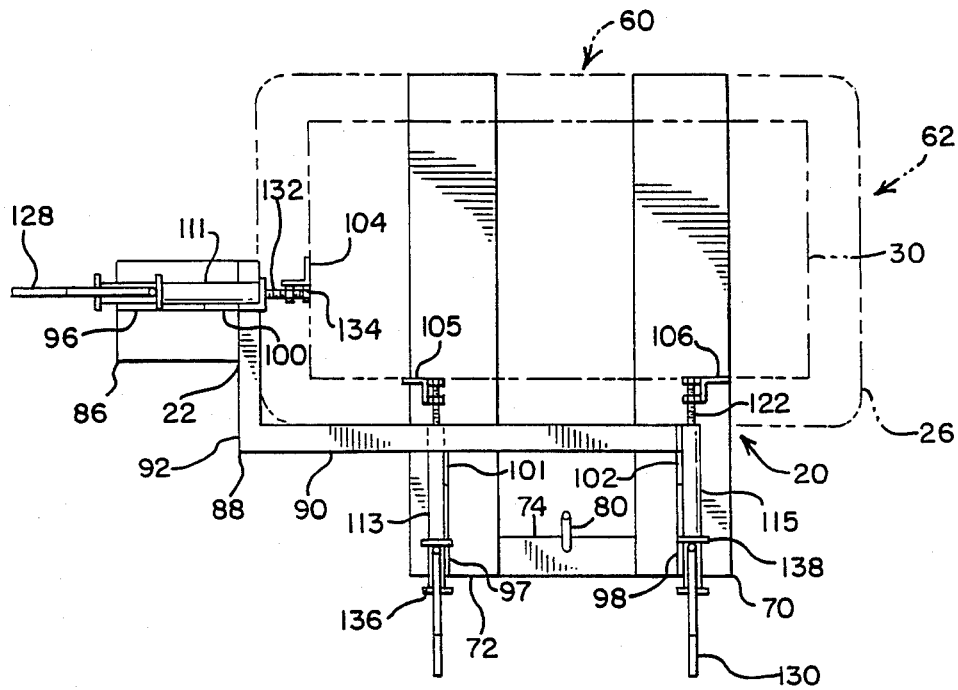
FIG_7
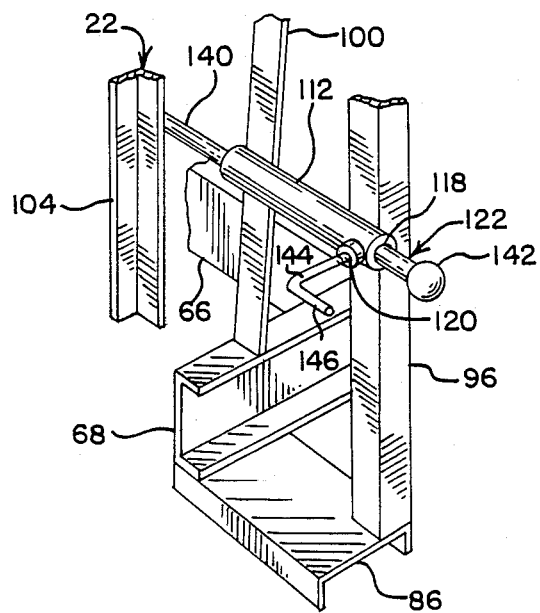
FIG_8

CELL ALIGNMENT FRAME ASSEMBLY

BACKGROUND OF THE INVENTION

This invention pertains to water purification and, more particularly, to a frame for efficiently and properly aligning a stack of water treatment membrane cells.

Untreated water from rivers, lakes, underground aquifers, and from other natural sources, as well as waste water discharged from refineries and industrial plants often contain contaminants, such as iron oxides, phenols, sulfides, oil, grease, ammonia, and particulates. If sufficient quantities of these contaminants are present, the water may not be safe to swim or drink. Furthermore, such water may corrode pipes, boilers, valves, and other equipment in oil refineries, petrochemical plants, power stations, and other industrial sites.

One way to treat water is by electrodialysis. In electrodialysis, water to be treated is fed through hundreds of electrodialysis membrane cells where it is subjected to a high voltage and sufficient current to remove substantial amounts of contaminants. If the cells are not in proper alignment, the efficiency and effectiveness of the electrodialysis cells can be seriously impaired so that sufficient levels of contaminants will not be adequately removed from the water. Improper cell alignment can also cause hot spots and damage to the cells. Misalignment of the cells can further cause water leakage which can be hazardous to operating personnel as well as unsightly and messy.

In the past, electrodialysis cells have been stacked with wooden pegs (stakes), flexible poles, steel dowel rods, wooden logs, and/or boards, such as 2 by 4 wooden boards (planks). None of these stacking aids work too well or are reliable. Such stacking aids often do not provide for proper alignment of the cells. Moreover, use of such prior art stacking aids are usually time-consuming and laborious. Wooden pegs are tedious, cumbersome, and often get stuck in the holes of the cells. Flexible poles and steel dowel rods allow undesirable curvature or stepwise stacking of the cells. Wooden logs and boards are primitive, awkward, difficult to use, and often ineffective.

Over the years various electrodialysis apparatuses, filter chambers, and other equipment have been suggested for use in cleaning water or other fluids or for other purposes. Typifying, some of these electrodialysis apparatuses, filter chambers, and other prior art equipment are those shown in U.S. Pat. Nos. 788,436; 1,529,867; 2,417,958; 3,219,573; and 3,276,190. These electrodialysis apparatuses, filter chambers, and other prior art equipment have met with varying degrees of success.

It is, therefore, desirable to provide improved equipment for stacking and aligning electrodialysis membrane cells, which overcome most, if not all, of the preceding problems.

SUMMARY OF THE INVENTION

An improved frame assembly is provided to align and stack a set of water purification filters or electrodialysis membrane cells in a vertical array. Advantageously, the novel frame assembly is easy to use, safe, and effective. It is also economical, reliable, and efficient.

To this end, the frame assembly has at least one end post and at least one side post. The posts are constructed and arranged to cooperate with each other to align and engage the edge portions of the filters or cells. The frame assembly has at least two posts and preferably less than four posts for best results. The frame assembly also has an access opening along its front and/or side, across from the posts, to facilitate insertion and stacking of the filters or cells against the posts. Frames with posts at all four corners should be avoided since that would undesirably require the filters or cells to be dropped, loaded, and stacked from the top causing rippling, damage, and misalignment of the filters or cells.

The frame assembly can have forklift channels, an L-shaped base and head, diagonal reinforcing struts, stationary columns or posts, moveable posts, and post adjustment assemblies to slidably move and adjust the positions of the moveable posts. The post adjustment assemblies can comprise cranks or slide rods.

The water purification filters or electrodialysis membrane cells when stacked and mounted on a platform comprise a water purification assembly and unit which can remove a substantial amount of contaminants, impurities, and pollutants from the water. The water to be treated can come from natural bodies of water such as rivers, lakes, ponds, underground aquifer streams, and oceans, or from waste water, process water, or recycle water discharged from industrial plants, such as oil refineries, chemical plants, paper mills, steel mills, power generation stations, pharmaceutical companies, medical supply houses, food processing plants, factories, laboratories, etc. The filters or cells are preferably rectangular and flexible, although other shapes and degrees of rigidity can be used.

The cell alignment frame assemblies can be built in various sizes and can accommodate different size membrane cells.

As used in this patent application, the abbreviation "EDR" means electrodialysis return.

A more detailed explanation of the invention is provided in the following description and appended claims taken in conjunction with the accompanying drawings.

BRIEF DESCRIPTION OF THE DRAWINGS

FIG. 1 is a perspective view of a frame assembly in accordance with principles of the present invention;

FIG. 2 is a perspective view of the cell alignment frame;

FIG. 3 is a perspective view of the cell alignment frame and the platform;

FIG. 4 is a perspective view of the cells being stacked upon the cell alignment frame;

FIG. 5 is a right side view of the cell alignment frame;

FIG. 6 is a back view of the cell alignment frame;

FIG. 7 is a top view of the cell alignment frame; and

FIG. 8 is a fragmentary perspective view of a ball-shaped handle adjustment assembly of another frame assembly in accordance with principles of the present invention.

DETAILED DESCRIPTION OF THE PREFERRED EMBODIMENTS

A cell alignment frame assembly 20 (FIGS. 1–7) comprises a rigid metal cell alignment frame 22 to efficiently assemble, stabilize, position, stack, support, and align flexible, wet, and often slippery, electrodialysis cell units 24 upon a rectangular, plastic, horizontal support platform 26 of an EDR (electrodialysis return) water purification, unit and assembly 28. When properly assembled, and subjected to sufficient current and voltage, such as 450–500 volts, the EDR unit or stack 28 functions as a high-powered battery with electroplates to remove a substantial amount of contaminants by electrodialysis from influent, raw untreated or partially treated water. The purified water can be safely fed into boiler tubes, or valves, or used in other equipment and processes.

One or more EDR stacks 28 (FIG. 1) can be used in conjunction with other water treating equipment to more fully treat and purify the water. For example, in the cogeneration power station of the Amoco Oil Company Refinery at Texas City, Tex., river water is passed through clarifier and softener units in which lime and coagulant are added to remove calcium carbonate and magnesium hydroxide in the water as well as to precipitate suspended solids from the water as sludge. Sulfuric acid is added to the water exiting the clarifier and softener units to lower the water's pH before the clarified water is passed through multi-media gravity filters. The multi-media gravity filters can include a cartridge system comprising spiral wound filters to filter a substantial amount of the remaining suspended solids in the water. The filtered water can be held in a storage tank before it is pumped at a rate of about 400 gallons per minute through eight parallel EDR trains. Each of the EDR trains comprise nine EDR stacks in series with each other. The EDR stacks remove about 90 percent of the dissolved ions in the water, mainly, cations of calcium, magnesium, and sodium, and anions of sulfate, carbonate, and chloride. The EDR treated water can be stored in another storage tank. The EDR treated water can be further conveyed to a demineralization train comprising cation and anion exchange vessels and a mixed bed demineralizer for further purification. In the cation exchange vessel, a cation resin exchanges hydrogen ions for remaining calcium, magnesium and sodium ions. In the anion exchange vessel, an anion resin adsorbs silica and exchanges hydroxide ions for sulfate, carbonate, and chloride ions. The water exiting the cation and anion exchange vessels is fed, mixed, and polished in a mixed bed demineralizer to remove any remaining trace contaminants. The purified water exiting the mixed bed demineralizer can be stored in other storage tanks before being pumped to a steam generating system or elsewhere.

In the preferred embodiment, each EDR stack or unit 28 (FIGS. 1 and 3) has a lower support platform 26 comprising a bottom end plate or end plate assembly with an electrode 30 comprising an anode and an outlet 31 for the plug of a power cord. The corners of the platform 26 can be rounded. Depending downwardly from the platform 26 is a flexible flared skirt 32 with front, back, and side portions 33-36. A set of four rigid, cylindrical, upright metal legs 38 are connected to the corners of the platform 26. The legs 38 extend below the skirt 32. Generally planar or flat, rectangular stabilizing shoes 40 are positioned below the side portions 35 and 36 of the skirt 32 and connect the left side legs and the right side legs 38.

A stack of rectangular, flexible, electrodialysis, water treatment, cell units 24 (FIGS. 1 and 4) are consecutively and sequentially positioned upon and extend above the support platform. The cell units comprise cell pairs with alternating anion and cation membrane cells 42 and 44, also referred to as anion and cation transfer membranes, and insulating flow spacers 46 between the cells 42 and 44. The anion membrane cells 42 comprise quaternary ammonium anion exchange resin cast in sheets. The cation membrane cells 44 comprise sulfonate cation exchange resin cast in sheets. The cells 42 and 44 have complementary generally opposite, S-shaped grooves, passageways, or water flow patterns 45 to provide for reverse (opposite) flow of water therethrough. The spacers 46 can comprise alternating demineralized water flow spacers and concentrate water flow spacers. The spacers can be molded of polyethylene. The cells 42 and 44 and spacers 46 are each generally rectangular with a back edge, a left side edge, a right side edge, and a front edge. The cells 42 and 44 and spacers can have matched, complementary central holes and inlet and outlet manifold passageways. In the Amoco Oil Company Refinery at Texas City, Tex., each stack 24 when fully assembled contains about 500 cells.

The top of each stack 24 can comprise a top end plate with an electrode comprising a cathode and can have a hood 48 (FIG. 1). The polarity of the EDR electrodes can be reversed 3 to 4 times each hour to minimize formation of film and scales. The hood 48 and platform 26 can have holes to receive tie rods, cylindrical columns or rails. Various pipes 50 for ingress and egress of water can be connected to the hood 48 as well as to the platform 26. There can be two entrance and two exit pipes 50 per stack with water entering and exiting both the top and bottom of the stack in countercurrent flow streams. The lower and upper electrodes 30 can comprise platinum plated titanium. Electrode compartments can be located at the top and bottom of the membrane stack. An electrode compartment is formed by an electrode, an electrode water flow spacer, and a heavy cation membrane. The electrode water flow spacers are similar to the other spacers, but thrice the thickness. The heavy cation membrane cells are similar to cation membrane cells, but twice as thick. The heavy cation membrane cells can be used in the electrode compartments as well as intersecting membranes for greater differential pressures.

The cell alignment frame 22 (FIGS. 1-7) facilitates stacking and improved alignment of the cell pairs, comprising cells 42 and 44 and spacers 46. The cell alignment frame 22 also accommodates stacking of the cell pairs in a substantially vertical array so that the cell units 24 are aligned in effective operable registration with each other. In the preferred embodiment, the cell alignment frame 22 has an open front 60 and an open left side 62, as viewed from the front 60. The open left side 62 is contiguous, in open communication, and cooperates with the open front 60 to facilitate ingress, access, placement, and stacking of the cell units 24 upon the platform 26 and against the cell alignment frame 22.

The cell alignment frame has an L-shaped base 64 (FIGS. 1-4) with an elongated, horizontal, lower, back channel member 66 and a shorter, horizontal, lower, right side channel member 68. The back member 66 is positioned generally opposite the front 60 of the frame 22 and adjacent the back skirt portion 34 of the platform 26. The right side channel member 68 is positioned generally opposite the open left side 62 and adjacent the right side skirt portion 36 of the platform 26. The right side channel member 68 is also perpendicular to and intersects the back channel member 64.

As best shown in FIGS. 2 and 3, a pair of parallel forklift tine-receiving channels 70 and 72 extends forward and rearwardly from, and are welded or otherwise securely connected to, the underside of the back channel member 66 of the base 64. The forklift channels 70 and 72 are also substantially parallel to the side member 68 of the base 64. The forklift channels 70 and 72 have aligned forward end portions, positioned forwardly of the back member 66, and generally rectangular, aligned rearward end portions, positioned rearwardly of the back member 66. An intermediate reinforcing back portion or member comprising a bight 74 extends between and is welded or otherwise securely connected to the rearward end portions of the forklift channels 70 and 72. The bight 74 is parallel to the back member 66 of the base 64. During stacking of the EDR cells 42 and 44, the forklift channels 70 and 72 can engage and support the underside of platform 26 of the EDR unit 28.

A jack 76 (FIGS. 1-6) is provided to adjust the height of the forklift channels 70 and 72. The upright rod 78 of the jack 76 extends vertically upwardly through the bight 74 and has an intermediate threaded portion which engages the bight 74. A crank 80 with a handle extends above the upper portion of the rod 78, as well as above the bight 74. A floor-engaging disc, stabilizing foot, or jack base 82 can extend below or be positioned adjacent the lower portion of the rod 78 to stabilize and support the jack 76 on a floor or the ground.

The cell alignment frame 22 has a horizontal right arm 86 (FIGS. 2-7) which extends laterally outwardly from the right side member 68 of the L-shaped base 64 and has an overhead top comprising a horizontal L-shaped head 88 which is positioned generally parallel to the L-shaped base 64. The head 88 has an elongated upper back member 90 and a shorter lower right side member 92. The upper back member 90 is positioned substantially parallel and above the lower back member 66 of the base 64. The shorter right side member 92 is positioned substantially parallel and above the lower right side member 68 of the base 64.

Reinforcing metal struts 94 (FIGS. 2-6) comprising stationary diagonal braces 96-98 and stationary posts 100-102 securely support and elevate the L-shaped head (top) 88 above the base. The diagonal braces 96-98 are positioned at an angle of inclination ranging from about 15 to about 75 degrees, preferably at least about 60 degrees relative to a horizontal axis, to keep the frame 22 compact. The diagonal braces 96-98 include a right side brace 96, a right (first) back brace 97, and a left (second) back brace 98. The right side brace 96 extends between and is welded or otherwise securely connected to the upper right side member 92 of the head 88 and the right arm 86. The right and left back braces, 97 and 98 extend between and are welded or otherwise securely connected to the upper back member 90 of the head and the rearward portions of the right and left forklift channels 70 and 72, respectively. The back braces 97 and 98 are parallel.

The stationary posts 100-102 can comprise parallel, vertical angle irons which are welded or otherwise securely connected to base 64 and the head (top) 88. The stationary posts include a stationary right side post 100, a stationary right (first) back post 101, and a stationary left (second) back post 102. The stationary right side post 100 extends vertically between and connects the upper right side member 92 of the head 88 and the lower right side member 68 of the base 64. The stationary right and left back posts 101 and 102 extend vertically between and connect the upper back member 90 of the head 88 and the lower back member 66 of the base 64. The stationary back posts 101 and 102 are positioned above the forklift channels 70 and 72.

In order to facilitate alignment of the cells 42 and 44, the cell alignment frame 22 has moveable upright metal abutment posts 104-106. The moveable abutment posts 104-106 can be slightly shorter than and parallel to the stationary posts 100-102. The moveable abutment posts 104-106 can further comprise parallel, vertical angle irons. The moveable abutment posts 104-106 include a moveable right side post 104, a moveable right (first) back post 105, and a moveable left (second) back post 106. The moveable right side post 104 is positioned laterally inwardly and to the left of the stationary right side post 100, as viewed from the front of the cell alignment frame 22. The moveable right side post 104 is moveable towards and away from the right side edges of the cell pairs to abuttingly engage (abut against) and align the right side edges of the cell pairs. The moveable, parallel back posts 105 and 106 are positioned forwardly of the stationary back posts 101 and 102 and are moveable towards and away from the back edges of the cell pairs to abuttingly engage and align the back edges of the cell pairs. The front faces of the moveable posts 104-106 which engage the edges of the cell pairs are generally planar or flat.

Elongated, stationary, horizontal, cylindrical tubular connectors 111-116 extend horizontally between, reinforce, and are welded or otherwise securely connected to the upper and lower portions of the struts 94. The tubular connectors 111-116 can comprise rigid metal tubes or annular members. Each of the tubular connectors 111-116 has an interior, axial, longitudinal, rod-receiving passageway, opening, or hole 118. The connectors 111-116 can also each have an optional transverse, internally threaded, opening, hole, or socket 120 (FIG. 8) that extends through the wall of the connector and communicates with the rod-receiving passageway 118. In the preferred embodiment, the tubular connectors include a pair of parallel, right side connectors 111 and 112, a first pair of parallel, right back connectors 113 and 114, and a second pair of parallel, left back connectors 115 and 116. The upper and lower, right side connectors 111 and 112 extend sideways and connect the upper and lower portions, respectively, of the right side brace 96 and stationary right side post 100. The upper and lower back connectors 113-116 extend forwardly and connect the upper and lower portions, respectively, of the back braces 97 and 98 and the stationary back posts 101 and 102. Preferably, the upper tubular connectors 111, 113, and 115 are positioned at about the same height and horizontal alignment with each other and the lower tubular connectors 112, 114, and 116 are positioned at about the same height and in horizontal alignment with each other.

Concentrically positioned in and extending horizontally through the rod-receiving passageways 118 of the tubular connectors 111-116 are moveable adjustment rods 122. The inner or front end portions of the rods 122 extend inwardly or forwardly of their associated tubular connectors 111-116 and are positioned in close proximity and operably connected to the moveable posts 104-106. The outer or back end portions of the rods 122 each extend outwardly or rearwardly of their associated tubular connectors 111-116 and terminate in an outer or rearward handle 128.

In the embodiment of FIGS. 1-7, the handles 128 are offset and comprise rotatable cranks 130. The rods 122 of the embodiment of FIGS. 1-7 can have threaded inner or forward and portions 132 which threadedly and rotatably engage one or more internally threaded nuts 134 that are welded or otherwise securely connected to the moveable posts 104-106. Circular annular discs 136 and 138 can be connected to the ends of tubular connectors 111-116. The discs 136 and 138 have central holes to center, guide, and rotatably receive the rods 122.

In the embodiment of FIG. 8, the handles on the outer back ends of each of the slide rods 140 comprise substantially spherical, ball-shaped handles 142. Each of the handles 142 are larger than the diameter of its associated rod-receiving passageway 118 and provide an abutment stop which limits the extent of inward sliding movement of its associated slide rod 140. Set screws 144 or other externally threaded transverse rods threadedly engage the transverse internally threaded openings 120 in the tubular connectors, such as 112, and are positioned transverse to the tubular connectors to abuttingly engage and releasably lock the slide rods 140 at the position selected by the operator (user) of the cell alignment frame 22. The transverse rods can have a handle comprising a crossbar 146.

In the embodiment of FIG. 8, the rods 122 comprise cylindrical slide rods 140 which slide horizontally towards and away from the cell pairs. The inner and front end portions of the slide rods 140 comprise moveable post-engaging end portions which are welded or otherwise securely connected to the moveable posts, such as 104.

The rods 122 are substantially similar in size and provide moveable post-adjustment assemblies for reciprocatingly moving and retractably sliding the moveable abutment posts 104-106 towards and away from the cell pairs to abut against and align the cell pairs in a vertical stack. The adjustment assemblies also maintain the moveable posts 104-106 in vertical positions.

In the embodiment of FIGS. 1-7, the rods 122 include a pair of parallel right side rods, a first pair of parallel, right back rods, and a second pair of parallel, left back rods. Each pair of rods comprises an upper horizontal rod and lower horizontal rod. The right side rods extend axially through the tubular side connectors 111 and 112, respectively, and move the moveable side post 104 laterally or sideways. The back rods extend axially through the back connectors 113-116, respectively, and move the moveable back posts 105 and 106.

In use, the forklift channels 70 and 72 are positioned against the bottom of the platform 26. The moveable posts 104-106 are moved to the desired vertical stacking position, such as adjacent the electrode 30, by sliding or craking (rotating) the rods 122 as appropriate. The slide rods 140 can be locked in position with the set screws 144. The desired number of cells 42 and 44 and spacers 46 are sequentially and alternately placed against the moveable posts 104-106 through the open front 60 and left side 62 of the cell alignment frame 22. Such an assembly and procedure quickly aligns and stacks the cell pairs in a vertical array. After the cells are stacked in vertical registration with each other, the platform 26 and EDR stack of cell pairs can be transported to this desired location, such as by an overhead crane hooked to the head 88 of the cell alignment frame 22 or by a forklift truck after the forklift tines are inserted in the forklift channels 70 and 72. The cell alignment frame 22 is then removed from the platform 26 and cell pairs, and the hood 48 and piping 50 are inserted or connected as appropriate. The procedure is repeated for subsequent stacks.

The cell alignment frames 22 of FIGS. 1-8 have been built and tested at the power station of the cogeneration plant at the Amoco Oil Company Refinery at Texas City, Tex. The cell alignment frames 22 have produced unexpected surprisingly good results. Alignment of the cells were much better, quicker, and easier to achieve with the novel cell alignment frames than prior art methods and devices.

Among the many advantages of the cell alignment frames and frame assemblies are:
1. Superior alignment and stacking of EDR cells.
2. Improved quality and assembly of EDR stacks.
3. Better purification and treatment of influent water.
4. Decreased manpower and time to install EDR stacks.
5. Less water leakage.
6. Convenient.
7. Economical.
8. Easy to use.
9. Safe.
10. Dependable.
11. Efficient.
12. Effective.

Although embodiments of the invention have been shown and described, it is to be understood that various modifications, additions, and substitutions, as well as rearrangements of parts and components, can be made by those skilled in the art without departing from the novel spirit and scope of this invention.

What is claimed is:
1. A frame assembly, comprising:
a support platform;
water purification means comprising a set of electrodialysis cells stacked upon said support platform for removing a substantial amount of contaminants from influent water, each of said electrodialysis cells having a periphery with edge portions; and
a frame for facilitating stacking and alignment of said electrodialysis cells in a column, said frame having a base and a top providing a head, said frame having diagonal braces and substantially stationary posts securely connected to said base and said top, said frame having moveable upright posts positioned substantially parallel to said stationary posts, said frame assembly having adjustment means securely connected to and extending between said braces and said moveable posts for substantially horizontally moving said moveable posts towards and away from said stationary posts to engage and substantially align the edge portions of said electrodialysis cells on said support frame, and said frame having an open front with means defining an access opening for facilitating frontal ingress and stacking of said electrodialysis cells on said support platform.

2. A frame assembly in accordance with claim 1 wherein said support platform is substantially rectangular with round corners including front corners and said stationary posts are substantially spaced from said front corners to prevent requiring said electrodialysis cells from being stacked from said top which could damage said electrodialysis cells.

3. A frame assembly, comprising:
an upright stack of substantially rectangular, electrodialysis cell units, said cell units comprising cell pairs with alternating anion and cation membrane cells and insulating spacers between said cells, said cells accommodating opposite flow of water therethrough, and said cells and said spacers each being substantially rectangular with a back edge, a left side edge, a right side edge, and a front edge;

a frame for supporting and positioning said upright stack of substantially rectangular, electrodialysis cell units in a substantially vertical array, said frame having an open front and one open side contiguous and in open communication with said front to facilitate access and stacking of said cell units;

said frame having a substantially L-shaped base with an elongated lower back member positioned generally opposite said open front and a shorter lower side member positioned generally opposite said open side, said shorter lower side member being positioned substantially perpendicular to and intersecting said lower back member;

a pair of substantially parallel forklift tine-receiving channels extending forwardly and rearwardly from the underside of said back member of said base, said fork-lift tine-receiving channels being substantially parallel to said side member of said base and having rearward portions;

an intermediate connecting back portion comprising a bight extending between and connecting said rearward portions of said forklift tine-receiving channels, and said bight being substantially parallel to said back member of said base;

a jack for adjusting the height of said frame, said jack having an upright rod extending substantially vertically through said bight, said upright rod having an upper portion, a lower portion, and an intermediate threaded portion for threadedly engaging said bight, said jack having a crank with a handle extending above said upper portion of said rod and said bight, and said jack having a floor-engaging foot comprising a disc connected to the lower portion of said rod;

a generally horizontal arm extending laterally outwardly from said side member of said base;

an overhead top comprising a substantially horizontal L-shaped head positioned substantially parallel to said L-shaped base, said head having an elongated upper back member positioned substantially parallel to said lower back member and upper side member positioned substantially parallel to said lower side member;

reinforcing struts supporting and elevating said L-shaped head above said base, said struts including diagonal braces and stationary posts;

said diagonal braces positioned at an angle of inclination ranging from about 15 degrees to about 75 degrees and including a side brace extending between and connecting said arm to said upper side member, a first back brace extending between and connecting the rearward portion of one of said forklift tine-receiving channels to said upper back member, and a second back brace extending between and connecting the rearward portion of the other of said forklift tine-receiving channels to said upper back member;

said stationary posts including a stationary side post extending substantially vertically between and connecting said lower side member and said upper side member, a first stationary back post positioned above one of said forklift tine-receiving channels and extending substantially vertically between and connecting said lower back member and said upper back member, and a second stationary back post positioned above the other of said forklift tine-receiving channels and extending substantially vertically between and connecting said lower back member and said upper back member;

moveable upright posts including a moveable side post positioned laterally inwardly and substantially parallel to said stationary side post for abuttingly engaging and substantially aligning the right side edges of said cells, and first and second moveable back posts positioned forwardly and substantially parallel to said first and second stationary back posts for abuttingly engaging and substantially aligning the back edges of said cells;

substantially horizontal tubular connectors defining rod-receiving passageways, said tubular connectors including a pair of tubular side connectors extending between and connecting said side brace and said stationary side post, a first pair of tubular back connectors extending between and connecting said first back brace and said first stationary post, and a second pair of tubular back connectors extending between and connecting said second back brace and said second stationary post;

adjustment assemblies for reciprocatingly moving said moveable posts against said cell units and for maintaining said moveable posts in substantially vertical positions to facilitate vertical alignment and stacking of said cell units, said adjustment assemblies comprising a pair of side rods positioned in and extending through said rod-receiving passageways of said tubular side connectors for laterally moving said moveable side post, said side rods having inner side end portions operably connected to said moveable side post, a first pair of back rods positioned in and extending through said rod-receiving passageways of said first pair of tubular back connectors for retractably moving said first moveable back post in a forwardly direction and in a rearwardly direction, said first pair of back rods having first front end portions operably connected to said first moveable back post, and a second pair of back rods positioned in and extending through said rod-receiving passageways of said second pair of tubular back connectors, for retractably moving said second moveable back post in a forwardly direction and in a rearwardly direction, and said second pair of back rods having second front end portions operably connected to said second moveable back post, whereby said adjustment assemblies cooperate with said moveable posts to facilitate stacking and substantial vertical alignment of said cell units.

4. A frame assembly in accordance with claim 3 wherein said adjustment assemblies comprise:
rotatable cranks with offset handles, and
nuts secured to said moveable posts; and
said rods have threaded end portions to threadedly engage said nuts.

5: A frame assembly in accordance with claim 3 wherein said side rods and said back rods are securely connected to said moveable posts and comprise substantially cylindrical slide rods with substantially spherical handles positioned substantially opposite said end portions and said adjustment assemblies further comprise set screws positioned transverse to and threadedly engaging said tubular connectors for abuttingly engaging and releasably locking said slide rods.

6. A frame assembly, comprising:

a water purification unit for removing a substantial amount of impurities from influent water, said water purification unit having a substantially rectangular, horizontal support platform with an electrode and a downwardly depending flexible flared skirt having front, back, and side skirt portions, a set of upright legs extending below said platform, stabilizing shoes positioned below said side skirt portions connecting some of said legs, a stack of substantially rectangular, flexible, electrodialysis cell units positioned upon and extending above said platform, said cell units comprising cell pairs with alternating anion and cation membrane cells and insulating spacers positioned between said cells, said anion and cation membrane cells having generally opposite water-flow patterns, and said cells and said spacers each being substantially rectangular with a back edge, a left side edge, a right side edge, and a front edge;

a frame for substantially stabilizing, supporting, and aligning said electrodialysis cell units upon said platform in substantial vertical registration with each other to form a substantially vertical stack of said cell units, said frame having an open front and one open side substantially contiguous and in open communication with said front for facilitating access and stacking of said cell units, said frame comprising:

a substantially L-shaped base with an elongated lower back member positioned generally opposite said open front and adjacent said back skirt portion of said platform, and a shorter lower side member positioned generally opposite said open side and adjacent one of said side skirt portions of said platform, said lower side member being positioned substantially perpendicular to and intersecting said lower back member;

a pair of substantially parallel forklift tine-receiving channels extending forwardly and rearwardly from the underside of the back member of said base, said forklift tine-receiving channels being substantially parallel to said side member of said base and having rearward portions, and said forklift tine-receiving channels being located below said platform for engaging and supporting said platform;

an intermediate connecting back portion comprising a bight extending between and connecting said rearward portions of said forklift tine-receiving channels, said bight being substantially parallel to said back member of said base;

a jack for adjusting the height of said frame, said jack having an upright rod extending substantially vertically through said bight, said upright rod having an upper portion, a lower portion, and an intermediate threaded portion threadedly engaging said bight, said jack having a crank with a handle extending above said upper portion of said rod and said bight, and said jack having a floor-engaging foot comprising a disc connected to the lower portion of said rod;

a generally horizontal arm extending laterally outwardly from said side member of said base;

an overhead top comprising a substantially horizontal L-shaped head positioned substantially parallel to said L-shaped base, said head having an elongated upper back member positioned substantially parallel to said lower back member and an upper side member positioned substantially parallel to said lower side member;

reinforcing struts supporting and elevating said L-shaped head above said base, said struts including diagonal braces and stationary posts;

said diagonal braces positioned at an angle of inclination ranging from about 15 degrees to about 75 degrees and including a side brace extending between and connecting said arm to said upper side member, a first back brace extending between and connecting the rearward portion of one of said forklift tine-receiving channels to said upper back member, and a second back brace extending between and connecting the rearward portion of the other of said forklift tine-receiving channels to said upper back member;

said stationary posts including a stationary side post extending substantially vertically between and connecting said lower side member and said upper side member, a first stationary back post positioned above one of said forklift tine-receiving channels and extending substantially vertically between and connecting said lower back member and said upper back member, and a second stationary back post positioned above the other of said forklift tine-receiving channels and extending substantially vertically between and connecting said lower back member and said upper back member;

moveable upright posts including a moveable side post positioned laterally inwardly and substantially parallel to said stationary side post for abuttingly engaging and substantially aligning the right side edges of said cells, and first and second moveable back posts positioned forwardly and substantially parallel to said first and second stationary back posts for abuttingly engaging and substantially aligning the back edges of said cells;

substantially horizontal tubular connectors defining rod-receiving passageways, said tubular connectors including a pair of tubular side connectors extending between and connecting said side brace and said stationary side post, a first pair of tubular back connectors extending between and connecting said first back brace and said first stationary post, and a second pair of tubular back connectors extending between and connecting said second back brace and said second stationary post;

adjustment assemblies for moving said moveable posts against said cell units and for maintaining said moveable posts in substantially vertical positions to facilitate vertical alignment and stacking of said cell units, said adjustment assemblies comprising a pair of side rods positioned in and extending through said rod-receiving passageways of said tubular side connectors for laterally moving said moveable side post, said side rods having inner side end portions operably connected to said moveable side post, a first pair of back rods positioned in and extending through said rod-receiving passageways of said first pair of tubular back connectors for retractably moving said first moveable back post in a forwardly direction and in a rearwardly direction, said first pair of back rods having first front end portions operably connected to said first moveable back post, and a second pair of back rods positioned in and extending through said rod-receiving passageways of said second pair of tubular back connectors for retractably moving said second moveable back post in a forwardly direction and in a rearwardly direction, and said second pair of back rods having second front end portions operably connected to said second moveable back post, whereby said adjustment assemblies cooperate with said moveable posts to facilitate stacking and substantial vertical alignment of said cell units.

7. A frame assembly in accordance with claim 6 wherein said adjustment assemblies comprise:
rotatable cranks with offset handles, and
nuts secured to said moveable posts; and said rods have threaded end portions to threadedly engage said nuts.

8. A frame assembly in accordance with claim 6 where said side rods and said back rods comprise substantially cylindrical slide rods with substantially spherical handles positioned substantially opposite said inner and front end portions, respectively, of said rods, said inner and front end portions of said slide rods comprising post-engaging end portions, said post-engaging end portions being fixedly connected to said moveable posts, and wherein said adjustment assemblies further comprise threaded transverse rods positioned transverse to and threadedly engaging said tubular connectors for abuttingly engaging and releasably locking said slide rods.

* * * * *

UNITED STATES PATENT AND TRADEMARK OFFICE
CERTIFICATE OF CORRECTION

PATENT NO. : 4,863,596

DATED : September 5, 1989

INVENTOR(S) : Gary L. O'Callaghan, et al

It is certified that error appears in the above-identified patent and that said Letters Patent is hereby corrected as shown below:

Col. 4, line 37, "intersecting" should read --interstaging--.

Col. 6, line 67, "and" should read --end--.

Col. 7, line 50, "craking" should read --cranking--.

Signed and Sealed this

Eighteenth Day of May, 1993

Attest:

MICHAEL K. KIRK

Attesting Officer

Acting Commissioner of Patents and Trademarks